INVENTORS:
FRANK MUCKLER
EDWARD B. YANDAS
By Gravely, Lieder & Woodruff
ATTORNEYS.

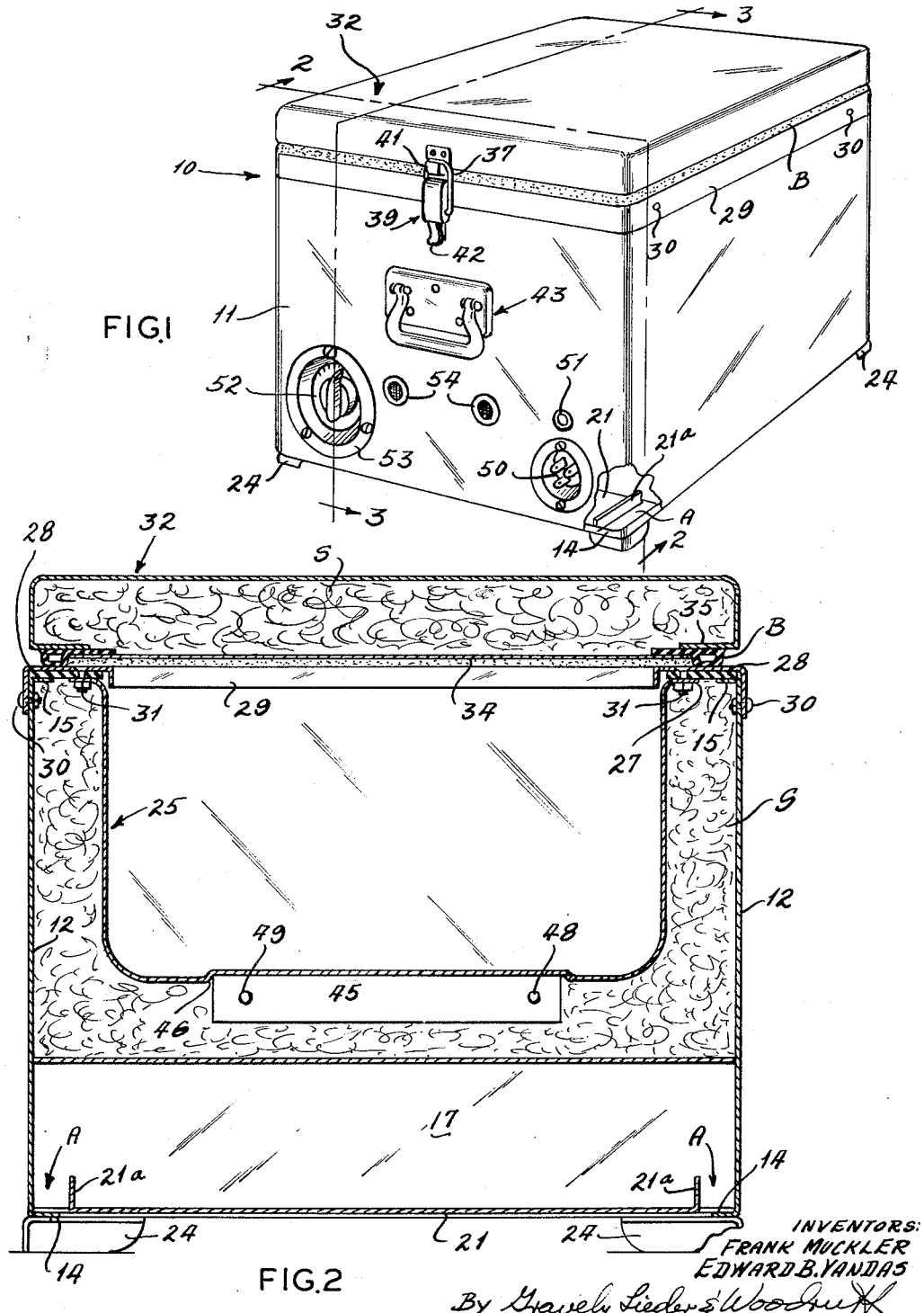

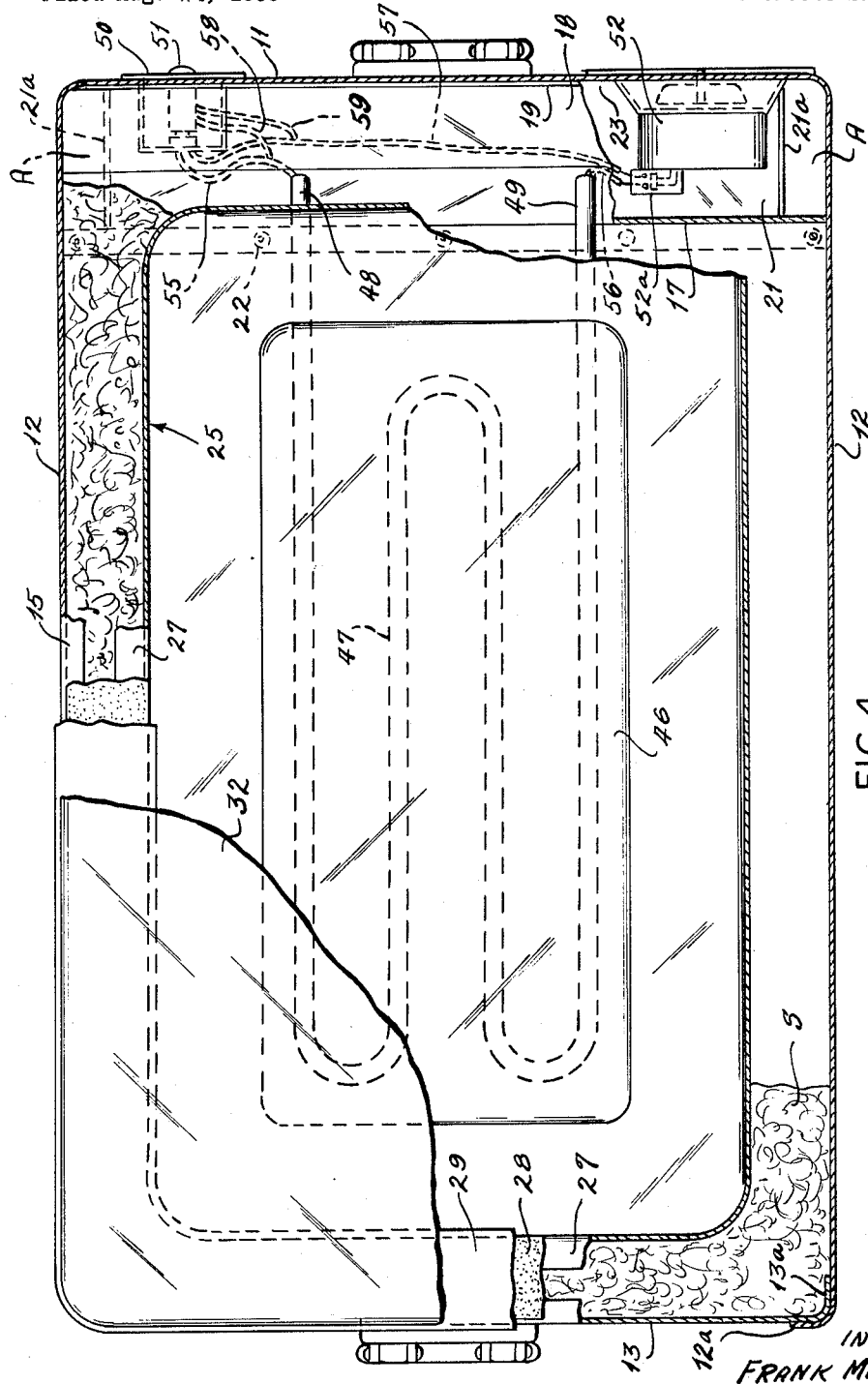

United States Patent Office 3,051,582
Patented Aug. 28, 1962

3,051,582
METHOD OF STORING PREPARED FOODS
Frank Muckler and Edward B. Vandas, Sappington, Mo., assignors to Southern Equipment Company, St. Louis, Mo., a corporation of Missouri
Filed Aug. 24, 1959, Ser. No. 835,585
4 Claims. (Cl. 99—171)

This invention relates to improvements in food storing and transporting containers, and the characteristic features thereof will be described and claimed in view of a preferred embodiment.

A principal object of the invention is to provide a compact and efficient container adapted for holding hot or cold food for long periods of time under conditions where the container serves as the carrying device and also as the display and serving apparatus.

Another principal object of the invention is to provide a food holding chest with heat storing means for heating foods and for holding desired temperatures of food over extended periods.

Still another object of the invention is to provide a versatile single heat storage cell which can be charged to provide the correct heat range for food pre-heating and storage, or merely warm storage, or for holding temperatures and serving temperatures.

A further object of the invention is to provide a large capacity portable container for foods, and the like, which may be conditioned at the place of loading, may be transported to distant places where food ready to be served is desired, and may be maintained at a desired temperature during the period of food serving.

Yet another object of the invention is to provide a simple, compact and inexpensive container, and to improve upon the construction of the container so that the aforesaid and other objects may be obtained.

The invention consists in the several features of construction, in the provision and application of a heat cell, and operation of a container of the character shown in the preferred embodiment which has been selected for disclosure in the accompanying drawings, wherein:

FIG. 1 is a perspective view of a preferred container which forms the subject of this invention;

FIG. 2 is a transverse sectional elevational view of the container taken at line 2—2 in FIG. 1;

FIG. 4 is a plan view of the container with portions broken away and other parts shown in section to illustrate structural characteristics thereof.

Figure 3:
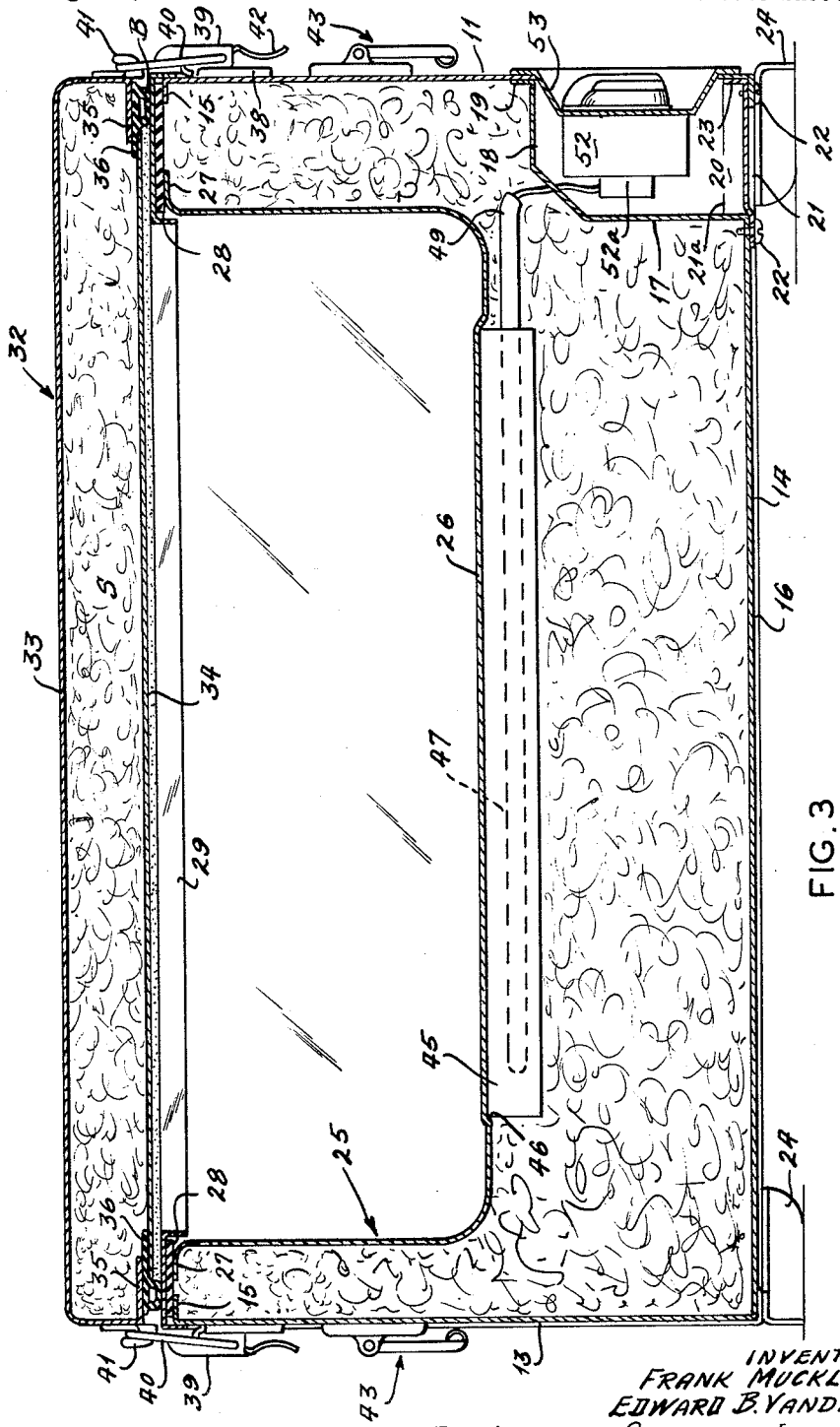
FIG. 3 is a longitudinal sectional elevational view taken at line 3—3 in FIG. 1.

In the views of the drawings it can be seen that the container 10 comprises a body having a front end wall 11, side walls 12 and a rear end wall 13. These walls are formed from a unitary sheet in which the ends are joined in lapped relation at 12a and 13a, as shown in FIG. 4 at one corner. Each wall is formed with an inturned bottom flange 14 and a similar inturned top flange 15. A bottom panel 16 is secured upon the respective bottom flanges 14 (FIG. 3) except that the forward end of the bottom panel is formed with a vertical partition 17 and an upper wall 18 ending in a flange 19 secured to the front end wall 11. The partition 17 and wall 18 form with the adjacent end wall 11 and side walls 12, a compartment 20 which extends across the width of the body 10 at the lower front end. A removable closure panel 21 is secured by means 22 adjacent the partition 17 and the panel 21 has a front flange 23 which is also secured to flange 14 by means 22 to fit snuggly against the inner surface of front end wall 11. The body is supported on corner feet 24.

As will presently appear, the closure panel 21 has end flanges 21a which are bent upwardly (FIGS. 1 and 2) so that a slot-like opening A is formed at each end of the compartment 20 to communicate with the exterior at the under side of the body.

The body 10 is provided with a deep well pan 25 (FIGS. 2, 3 and 4) of one-piece construction in which the bottom is provided with an upwardly dished portion 26 for a purpose to appear. The pan 25 is provided with a rim lip 27 positioned in the plane of the flanges 15 of the body side and end walls. The rim lip 27 and the flanges 15 are retained in spaced relation by a heat insulating gasket 28, and a flanged cap member 29 is positioned over the rim lip, flanges 15 and gasket 28. The cap member forms the supporting member for suspending the deep well 25 in spaced relation from the surrounding body walls 11, 12 and 13 so that the well is thermally isolated. Any suitable connecting means, such as threaded means 30 and 31, may be used to secure the cap member 29 to the respective rim lip 27 and flanges 15. The space surrounding the deep well 25 is filled with suitable insulating material S.

A cover 32 having a one-piece outer wall 33 and an inner closure panel 34 is filled also with a body S of insulating material. The outer wall 33 is provided with an inturned flange 35 which forms a seat for a resilient gasket 36, and the gasket has a bead B which abuts the cap member 29 to act as a seal when the cover 31 is in place. The cover closure panel 34 is secured in any suitable manner to the flange 35 and clamps the gasket 36 in position.

Latch devices at the ends of the body serve to draw the cover 32 down into position on the body 10, each latch device comprises a mounting plate 38 fixed on the end walls 11 and 13, a pivoted body 39 on the plate 38, and a bail loop 40 carried by the body 39. The bail 40 engages a detent or latch hook 41 fixed on the cover. A latch handle 42 is carried on the body 39. The body may be provided with carrying handles 43 secured to the end walls 11 and 13, as shown.

Means for supplying heat to the deep well is provided by a heat cell or block 45 which is seated in a shallow recess 46 formed in the bottom of the pan 25. The block contains heating elements in the form of a continuous back and forth loop of resistance cable 47 having the ends 48 and 49 exposed at the end adjacent the partition 17. The electrical connection for the heating elements is made at a receptacle 50 seated in the end wall 11 so that the same is housed in compartment 20 for accessibility from the bottom while panel 21 is removed. A tell-tale light 51 is disposed adjacent the receptacle 50 and is wired into the circuit in known manner to indicate, by being lighted, when current is on the heating element 47.

Near the opposite end of the compartment 20, a heat control device, such as an automatic timer device 52, of known construction, is mounted in a recessed plate 53, in turn, fastened in the end wall 11. The cell block 45 is energized with heat to the required level by controlling the time it takes to store the necessary B.t.u. so that it will give up the heat as required and without peak temperature effect which may exceed the safe level for the food. Since a certain amount of heat reaches the compartment 20, ventilation is provided through slots A at each end of removable panel 21, and near the upper side of the compartment a pair of outlet vent plugs 54 (FIG. 1) are disposed in the wall 11 to provide escape openings. Thus a flow of air is established from bottom openings A past the receptacle 50 and control 52 to the vent plugs 54. Any known circuit is used to connect the receptacle contacts to the heating unit 47 and to the contacts in the switch unit 52a carried at the control 52. The circuit shown includes the line 55 from one side of the receptacle 50 to the heater 47, the line 56 from the heater 47 to one side of the switch 52a, and a line 57 from the other side of the switch to the remaining side of the switch 52a. A shunt or jumper for the tell-tale light 51 is found in the leads 58 and 59 connected as shown so that the switch 52a may be used for the light.

The heat storing capacity of the apparatus is found in the block 45 which has a large area in intimate contact with the pan 25, the preference being to have the contact area of the block about one-half the area of the pan bottom and to limit the volume of the pan space to from ten to fifteen times the volume of the block 45. Commercial success has been obtained with a pan volume approximately thirteen times the block volume, where the block was cast aluminum with a Calrod heating unit unbedded in it. Heat storing ability of the block is quite rapid and the large area of the block delivers heat uniformly throughout the pan. The construction of the body to avoid avenues of heat loss to the outside surfaces aids in the good results reached.

In operation, the unit may act as a warm storage by preheating the block with the well 25 empty and disconnecting or setting the timer 52 at "off" so that the B.t.u. stored in the block or cell 45 will be returned to the food in the well 25. Also, preheated food may be placed in the well after heating the cell 45, and after transportation to a place of use, the unit may be reconnected to an electrical source to reenergize the cell so that the heat storage cycle may be extended. The advantage of a unit of the present invention resides in the ability of the heat block or cell 45 to hold a maximum of B.t.u. at the ideal low temperature level to protect the food. It is also advantageous in that the unit can reach a maximum temperature for the food and not exceed the safe food temperature level while giving up the stored B.t.u. at a rate so that the food is not overheated or destroyed. The useful effect of this unit is believed to come from the system or method of delivering heat under time control to a block or cell for a time which allows maximum heat absorption, without concentrated high temperature levels, in a condition of thermal isolation except to the area or well where the heat will be delivered under a state of slow heat dissipation.

What is claimed is:

1. The method of holding food prepared in one place and transported to another place in appetizing condition in a closed space and in substantially its prepared condition comprising the steps of providing a portable container with a food receiving well having heat conductive walls and heat storing means in thermal contact with a portion of the conductive walls, delivering heat to said storing means and accumulating the heat for subsequent dissipation into the well through the conductive walls, discontinuing heat delivery to the storing means after the food receiving well has been preconditioned, providing a substantially complete thermal barrier about the exterior of the food receiving well and heat storing means so that the preconditioning of the well is substantially maintained and the accumulated heat travels into the food well as its principal route of dissipation, and placing the previously prepared food in the well where it continues to receive heat.

2. The method of handling food prepared in one place and transported to another place in appetizing condition and substantially at serving temperature level including placing the food in its prepared condition in a closed thermally insulated well, preconditioning the well to receive the food and maintain the well in near preconditioned state by accumulating heat in a thermally receptive mass adjacent a surface of the well so that heat flows from the mass into the well during the heat accumulating step until a maximum temperature level is reached which is not deleterious to the food and proportioning the surface area of the well which gives up heat to the food with the area of the mass against the well so that the area of the well gives up heat to the space occupied by the food at a rate which avoids overheating the food.

3. In a method for maintaining food prepared in a central place and transported to another place for consumption in substantially its hot prepared condition until ready for consumption, the steps of providing a transportable chest with a prepared food receiving space having a thermally conductive wall, locating a heat accumulating mass on the outside of the chest space in thermal contact with the conductive wall, raising the temperature of the mass to a level above the temperature for the space so that the heat flow out of the mass reaches substantially all areas of the thermally conductive wall, placing the food in its initially hot prepared condition in the receiving space, and enclosing the space with an insulating barrier to restrict substantially all of the heat imparted to the mass and conducted through the wall to flow into the space occupied by the prepared food.

4. In a method for maintaining food prepared in one place and moved to a remote place for consumption in substantially its initially hot prepared condition for long periods of time, the steps of providing a transportable chest with a space having a thermally conductive wall over the bottom, sides and ends of the space, providing a heat storing block in contact with the bottom portion of the thermally conductive wall and proportioned so that its cubic volume is approximately from one tenth to one fifteenth the cubic volume of the chest space for the prepared food, imparting heat to the block to precondition the chest space by radiation from the walls, placing the hot prepared food in the chest space, closing the chest space in insulation so that the heat flow out of the block is substantially confined to the thermally conductive walls and the prepared food is thereby maintained in nearly original condition.

References Cited in the file of this patent
UNITED STATES PATENTS

| | | |
|---|---|---|
| 2,658,986 | Gronlund | Nov. 10, 1953 |
| 2,767,100 | Clarke | Oct. 16, 1956 |
| 2,839,654 | Jones et al. | June 17, 1958 |
| 2,850,391 | Gunsberg | Sept. 2, 1958 |
| 2,889,443 | Dobmeier | June 2, 1959 |
| 2,990,286 | Clarke et al. | June 27, 1961 |